United States Patent [19]

Wagner

[11] Patent Number: 5,425,115
[45] Date of Patent: Jun. 13, 1995

[54] POLARIZATION INSENSITIVE OPTICAL SWITCH

[75] Inventor: Harvey L. Wagner, Royersford, Pa.

[73] Assignee: Martin Marietta Corporation, East Windsor, N.J.

[21] Appl. No.: 276,722

[22] Filed: Jul. 18, 1994

[51] Int. Cl.⁶ .............................................. G02B 6/34
[52] U.S. Cl. .................................... 385/16; 385/18; 385/21; 385/22; 385/23; 385/24; 385/31; 385/36; 385/37; 385/40
[58] Field of Search ............... 385/15, 16, 18, 20–23, 385/24, 31, 36, 37, 40

[56] References Cited

U.S. PATENT DOCUMENTS

| | | | |
|---|---|---|---|
| 4,720,174 | 1/1988 | Baker | 350/347 |
| 4,779,959 | 10/1988 | Saunders | 350/346 |
| 4,790,634 | 12/1988 | Miller et al. | 350/347 |
| 4,913,509 | 4/1990 | Baker | 350/96.16 |
| 4,932,739 | 6/1990 | Islam | 350/96.15 |
| 5,029,987 | 7/1991 | Shinomiya | 350/340 |
| 5,050,954 | 9/1991 | Gardner et al. | 385/16 |
| 5,080,491 | 1/1992 | Monchalin et al. | 356/352 |
| 5,111,321 | 5/1992 | Patel | 359/92 |
| 5,168,383 | 12/1992 | Iwaki et al. | 359/71 |
| 5,283,845 | 2/1994 | Ip | 385/24 |

OTHER PUBLICATIONS

"Electro-Optic Switch Using A Liquid Crystal Fabry-Perot Filter", Patel, published in SPIE, vol. 1665 (1992), pp. 244–249 (no month avail.).

"Electrically Tunable and Polarization Insensitive Fabry-Perot Etalon With a Liquid-Crystal Film", Patel et al., published at pp. 2491–2493 of Appl. Phys. Lett. 58 (22), 3 Jun. 1991.

Primary Examiner—Frank Gonzalez
Attorney, Agent, or Firm—W. H. Meise; C. A. Berard; S. A. Young

[57] ABSTRACT

A Fabry-Perot etalon 10 is located in the light path 30 between a light sourcesinks 40 and 44. The etalon is polarization insensitive, and its optical path length and transmission wavelength(s) is controlled by a bias source 60. When light at the desired wavelength is propagating from source 40, the bias is set to establish transmission through the etalon at that wavelength, whereupon the light propagates to the sink 44, and the switch is transmissive. By contrast, if the switch is to be nontransmissive, the bias sets the transmission wavelengths of the etalon on either side of the wavelength produced by source 40, whereupon the light from source 40 is reflected by the etalon, and does not reach sink 44. In a second embodiment, a third sourcesink 48 is coupled in a second light path 330a, for being coupled to the first sourcesink 40 when the etalon is set for reflection, to thereby form a single-pole, double-throw switch. In a third embodiment, a fourth sourcesink 68 is coupled in an extension maim of the second light path.

8 Claims, 3 Drawing Sheets

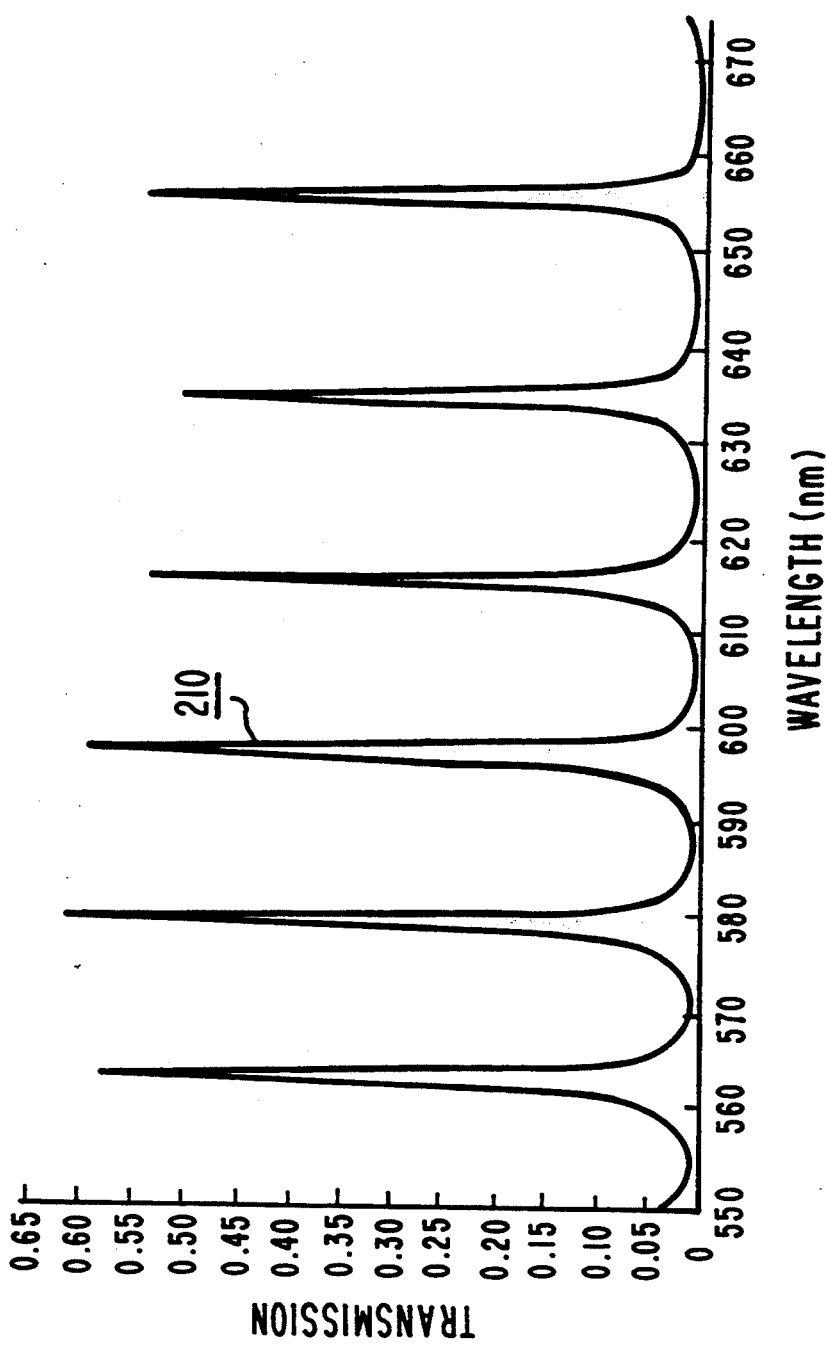

POLARIZATION INSENSITIVE OPTICAL SWITCH

FIELD OF THE INVENTION

This invention relates to optical switches, and more particularly to electrically operated, nonmechanical, optical switches using Fabry-Perot etalons as the active element.

BACKGROUND OF THE INVENTION

The great expansion of data communications, and the increases in the bandwidth of communications and control purposes, has led to increased use of optical signal paths for carrying wide-bandwidth optical systems. A particular problem with optical control systems is that of switching light signals flowing in a light path, as for example switching the light path ON or OFF as to a receiving device, or of switching light flowing along a signal path among two or more signal paths.

The prior art contains many mechanically operated switches, such as those which physically move a mirror on a flexible mirror support into an optical path between aligned, collimated optical fibers, to thereby couple the light to either a first or a second output optical fiber, or which move the end of an optical fiber between a first position in which it couples light into an output optical fiber and a second position in which light is not so coupled. Such mechanical switches often require close mechanical tolerances, and may be expensive for that reason. Mechanical switches also tend to have reliability problems attributable to such factors as fatigue of the moving member resulting from repeated flexing, and from misalignment due to shock and vibration, and also tend to have limited operating or switching speed resulting from mechanical inertia.

Other optical switches are nonmechanical, but are more complex than might be desired, due to the use of switching devices which are polarization-sensitive. If the light being switched is unpolarized, a polarization-sensitive switch will switch only the preferred polarization, with the result that the non-preferred polarization is not switched. This, in turn, results in a 3-dB loss in the switch as to the switched signal, and may result in poor isolation as a result of the large amount of signal power remaining in the switched channel. This polarization sensitivity can be corrected, as, for example, in U.S. Pat. No. 4,913,509, by separately processing the two different polarizations, but this results in added complexity.

Improved nonpolarized optical switches are desired.

SUMMARY OF THE INVENTION

An optical switch comprises a first optical fiber optically coupled with a first collimating lens, for transducing signals between the first optical fiber and a first portion of a first free-space beam path. A second optical fiber is optically coupled with a second collimating lens, for transducing signals between the second optical fiber and a second portion of the first free-space beam path. An active polarization-insensitive Fabry-Perot cavity etalon includes first and second planar light ports, for transmitting light between the ports at a plurality of transmission wavelengths related to the optical length of the cavity, and for reflecting light at reflection wavelengths other than the transmission wavelengths. The active polarization-insensitive Fabry-Perot cavity etalon further includes electrodes to which bias voltage may be applied for changing the optical length of the cavity. The active polarization-insensitive Fabry-Perot cavity etalon is placed in the first free-space beam path, with the first light port optically coupled by the first portion of the first free-space beam path to the first optical fiber, and with the second light port optically coupled by the second portion of the first free-space beam path to the second optical fiber. The optical fibers may be terminated in expansion and/or collimating lenses. A bias voltage generating arrangement is coupled to the electrodes of the active polarization-insensitive Fabry-Perot cavity etalon, for controlling the optical length of the cavity. Thus, when a particular wavelength of light is applied to one of the first and second optical fibers, and the bias voltage is set to select that particular wavelength as the transmission wavelength, the particular wavelength of light is transmitted from the one of the first and second optical fibers, through the corresponding one of the first and second collimating lenses, if used, and traverses a portion of the first free-space beam path to one of the first and second light ports of the active polarization-insensitive Fabry-Perot cavity etalon, and is transmitted through the active polarization-insensitive Fabry-Perot cavity etalon to the other one of the first and second light ports, and traverses another portion of the first free-space beam path from the other one of the first and second light ports to the other one of the first and second collimating lenses and the corresponding one of the first and second optical fibers, so that light is transmitted between the first and second optical fibers. Similarly, when the particular wavelength of light is applied to one of the first and second optical fibers, and the bias voltage is set to select a second wavelength, different from the particular wavelength, as the transmission wavelength, the particular wavelength of light is transmitted from the one of the first and second optical fibers, and traverses a portion of the first free-space beam path to one of the first and second light ports of the active polarization-insensitive Fabry-Perot cavity etalon, and is reflected by the active polarization-insensitive Fabry-Perot cavity etalon, so that light is not transmitted between the first and second optical fibers.

According to a second embodiment of the invention, an optical switch as described above has the planes of the first and second planar light ports of the active polarization-insensitive Fabry-Perot cavity etalon mutually parallel. The plane of the first planar light port is skewed away from orthogonal to the first portion of the first free-space beam path, whereby light traversing the first portion of the first free-space beam path, and reflected by the first light port of the active polarization-insensitive Fabry-Perot cavity etalon, traverses a first portion of a second free-space beam path skewed relative to the first free-space beam path. In this second embodiment, the optical switch further includes a third optical fiber for transducing signals between the third optical fiber and the first portion of the second free-space beam path, whereby, when the particular wavelength of light is applied to one of the first and third optical fibers, and the bias voltage is set to select the second wavelength, different from the particular wavelength, as the transmission wavelength, the particular wavelength of light is transmitted from one of the first and third optical fibers, and traverses the corresponding first portion of one of the first and second free-space beam paths to the first light port of the active polarization-insensitive Fabry-Perot cavity etalon, and is reflected by the first light port of the active polarization-insensitive Fabry-Perot cavity etalon, and traverses the first portion of the other one of the first and second free-space beam paths to the other one of the first and third collimating lenses and the other one of the first and third optical fibers, so that, when the optical switch provides no coupling at the particular wavelength between the first and second optical fibers, coupling is provided at the particular wavelength between the first and third optical fibers.

A third embodiment of the invention is similar to that described above, but differs in that the plane of the second planar light port is skewed away from orthogonal to the second portion of the first free-space beam path, whereby light traversing the second portion of the first free-space beam path, and reflected by the second light port of the active polarization-insensitive Fabry-Perot cavity etalon, traverses a second portion of the second free-space beam path skewed relative to the first free-space beam path. The optical switch of the third embodiment further includes a fourth optical fiber optically, for transducing signals between the fourth optical fiber and the second portion of the second free-space beam path, whereby, when the particular wavelength of light is applied to one of the second and fourth optical fibers, and the bias voltage is set to select the second wavelength, different from the particular wavelength, as the transmission wavelength, the particular wavelength of light is transmitted from one of the second and fourth optical fibers, through the corresponding one of the second and fourth collimating lenses, and traverses the second portion of the corresponding of one of the first and second free-space beam paths to the second light port of the active polarization-insensitive Fabry-Perot cavity etalon, and is reflected by the second light port of the active polarization-insensitive Fabry-Perot cavity etalon, and traverses the second portion of the other one of the first and second free space beam paths to the other one of the second and fourth collimating lenses and the other one of the second and fourth optical fibers, so that, when the optical switch provides no coupling between the first and second optical fibers at the particular wavelength, coupling is provided at the particular wavelength between the second and fourth optical fibers.

The active polarization-insensitive Fabry-Perot cavity etalon includes first and second mutually parallel semitransparent substrates defining a cavity therebetween, and also includes a material within the cavity, which has an optical path length which may be varied by the application of an electric field. Such a material may be PLZT, which is an optically transparent ceramic material, or a liquid crystal material may be contained within the cavity. When liquid crystal material is used, the cavity is bounded by an arrangement for tending to align the molecules of the liquid crystal material parallel to the interior surfaces of the cavity, with those molecules adjacent the first substrate oriented orthogonal to those molecules adjacent the second substrate, as a result of which light polarization tends to be rotated as it follows the orientation of the liquid crystal material. Any light traversing the cavity, with the molecules of the liquid crystal material oriented parallel with the surfaces of the substrate, and with the molecules at the two surfaces mutually orthogonal, experiences a particular index of refraction for all polarizations (non-birefringence). The Fabry-Perot etalon of the liquid crystal embodiment further includes first and second transparent electrodes associated with the first and second substrates, respectively, for, when subjected to a differential voltage, tending to rotate the molecules of the liquid crystal material toward a position orthogonal to both the first and second substrates, thereby tending to make the index of refraction of the liquid crystal material the same for all polarizations of light traversing the cavity, whereby the Fabry-Perot etalon is polarization-insensitive in both the energized and unenergized states of the liquid crystal material of the Fabry-Perot etalon.

DESCRIPTION OF THE DRAWINGS

FIG. 2a is a plot of the transmission characteristics of the etalon of FIG. 1.

DESCRIPTION OF THE INVENTION

Figure 1:
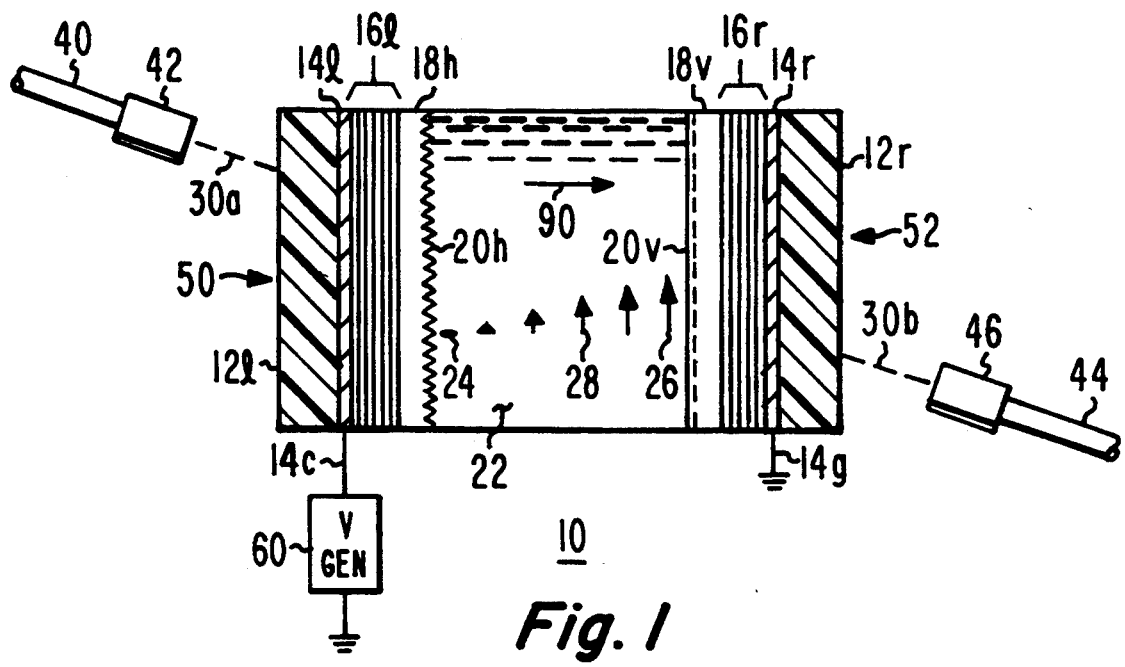
FIG. 1 is a simplified diagram illustrating a first embodiment of an optical switch according to the inventions and illustrating details of the structure of the etalon switching device and its control circuit for use as single-pole, single-throw optical switching application.

FIG. 1 is a simplified diagram of a Fabry-Perot etalon 10 which may be coupled with a first optical fiber 40 and an associated expanding and or collimating lens 42, and a second optical fiber 44 and associated expanding and or collimating lens 46, to form an electrically controllable optical switch.

In FIG. 1, etalon 10 is a tunable liquid-crystal Fabry-Perot etalon, also known generally as a Fabry-Perot interferometer, tunable etalon, resonant cavity interferometer, and the like. Etalon 10 of FIG. 1 includes transparent silica or quartz left and right substrates 12l and 12r, respectively, which preferably have mutually parallel interior surfaces. The inside surfaces of substrates 12l and 12r are each coated with a layer 14l, 14r, respectively, of transparent electrical conductor material; which may be, for example, tin oxide, indium oxide, or indium-tin oxide. Conductive layer 14r is connected to ground, and conductive layer 14l is connected to conductor 14c for receiving voltages which change in accordance with the desired state of the optical switch. A partially transparent or semitransparent reflector 16l overlies electrically conductive layer 14l, and a similar semitransparent reflector 16r overlies conductor 14r. Such a semitransparent reflector layer corresponds conceptually to a "half-silvered" or "one-way" metallic mirror. Such half-silvered metallic mirrors may be used, but tend to have high attenuation or loss, which offsets their advantage of not needing separate silica or other transparent protective windows. Instead, semitransparent reflector layers 16l and 164r are layered dielectrics, known in the art for low loss, selected to produce the desired semi transparency and reflectivity. A cavity 22 lying between semitransparent reflectors 16l and 16r is filled with liquid crystal material.

The liquid crystal material filling cavity 22 of the etalon of FIG. 1 exhibits birefringence, which is a difference in the index of refraction, depending upon the polarization of the light which passes therethrough relative to the orientation of the liquid crystals. This may be explained by noting that under normal, unenergized conditions, the liquid crystal material in cavity 22 tends to assume a "crystalline" form, with the molecules aligned in a particular direction, which may random. For purposes of making the switch according to the invention polarization-insensitive, the direction of the preferred orientation of the liquid crystal material must be controlled. Control is achieved by a further pair of layers 18h and 18v of buffed polyimide, which are placed on reflector layers 16l and 16r, respectively, of the etalon of FIG. 1, for aiding in aligning the molecules of the liquid crystal. Each layer 18h and 18v has a grating of mutually parallel brushed or rubbed grooves 20 in the polyimide interior surfaces facing the cavity, which orient the molecules adjacent the surface parallel to the grooves, and thereby establish the "crystal" orientation. Other methods of orienting the molecules are known, including vacuum deposition of silicates at a glancing angle to the surface, to establish an alignment layer with preferred linear orientation. According to an aspect of the invention, the liquid crystal molecule orientation is parallel to the surfaces of the substrates 12, but the orientation of the liquid crystals of the liquid crystal material at the left surface is orthogonal to the orientation of the liquid crystals of the liquid crystal material at the right surface. This may be further explained by assuming that the grooves 20h brushed or rubbed into the left polyimide layer 18h are horizontal, and that the grooves 20v brushed or rubbed into the right polyimide layer 18v are vertically oriented. Under these conditions, the orientation of the liquid crystal material adjacent each of the left and right surfaces of cavity 22 will be controlled by the direction of grooves 20; horizontal at the left and vertical at the right. The horizontal polarization or orientation of the molecules of the liquid crystal material adjacent left coating 18h is illustrated as an arrowhead 24, while the vertical orientation of the molecules of the liquid crystal material adjacent right surface 18v is illustrated as 26. Between the two surfaces, the molecular orientation of the liquid crystal material gradually rotates, as suggested by the arrows designated 26. The molecular alignment of the liquid crystal material relative to the polarization of the light passing therethrough affects the index of refraction, and therefore the propagation delay, of the liquid crystal medium. This difference in the relative delays is the reason that liquid crystal devices are polarization-sensitive. Under the condition of vertical molecular alignment, light which is principally polarized vertically will experience a particular propagation delay, which is generally greater than the propagation delay experienced by horizontally polarized light. The relatively large index of refraction resulting from polarization of the electric field component of the incident light parallel to the molecules of the liquid crystal tends to cause the liquid crystal to delay propagation of light by an amount greater than when the light is polarized orthogonally to the molecules. When, however, the liquid crystal orientation rotates by 90° along the path taken by the light through the cavity of the liquid crystal device, each polarization of light passes through the same range of delays or index of refraction changes. Consequently, such light as is transmitted through cavity 22 of etalon 10 of FIG. 1 does so with an effect which is insensitive to the polarization of the light, and more particularly, when light is incident from air into the etalon of FIG. 1, and the etalon is short in terms of wavelengths, polarization-insensitive transmission takes place in the absence of bias. It should be noted that off-resonant reflection is always polarization-insensitive if both the $n_o$ and $n_e$ axes reflect.

It has been found that the multiple internal reflections which occur in the etalon operating at angles of light incidence other than normal do not cause the reflected signal to "walk" significantly along the interior of the cavity so long as the cavity is short or "thin"; the transmission through the cavity with light incidence at angles away from the normal, as illustrated in FIG. 1, is similar to that which occurs with normal incidence of the light.

When a voltage is applied from a bias voltage source 60 of FIG. 1, by way of conductor 14c and ground 14g, to conductive electrodes 14l and 14r, a bias electric field is generated across the liquid crystal material in cavity 22, and the molecules of the liquid crystal material tend to rotate into an alignment parallel with the bias electric field, which position is illustrated by arrow 90 in FIG. 1. Rotation of the molecules into parallelism with the bias electric field, results in the molecules no longer being parallel to the electric field component of the incident light, and the propagation delay, and consequently the index of refraction, is reduced from the parallel state, but more importantly, the effect of the molecules in the position illustrated as 90 is polarization-insensitive as to incident light.

The change in light propagation delay resulting from application of a bias voltage corresponds to changing the effective length of cavity 20 as a function of the applied voltage. Whatever the actual mechanism by which the result is accomplished, an etalon such as that described in conjunction with FIG. 1 has the property of responding to or filtering light at frequencies or wavelengths which depend upon the applied bias voltage, as described in more detail in U.S. patent application Ser. No. 08234,771, filed Apr. 21, 1994 in the name of Wagner.

As known to those skilled in the art, Fabry-Perot etalons typically have a periodic filter function given by $$2n\, d\, \cos\theta = m\lambda \qquad (1)$$

where
  n is the refractive index of the medium;
  d is the mirror spacing;
  $\theta$ is the inclination of the normal of the mirrors;
  m is the order of the interference; and
  $\lambda$ is the wavelength.

Figure 2B:
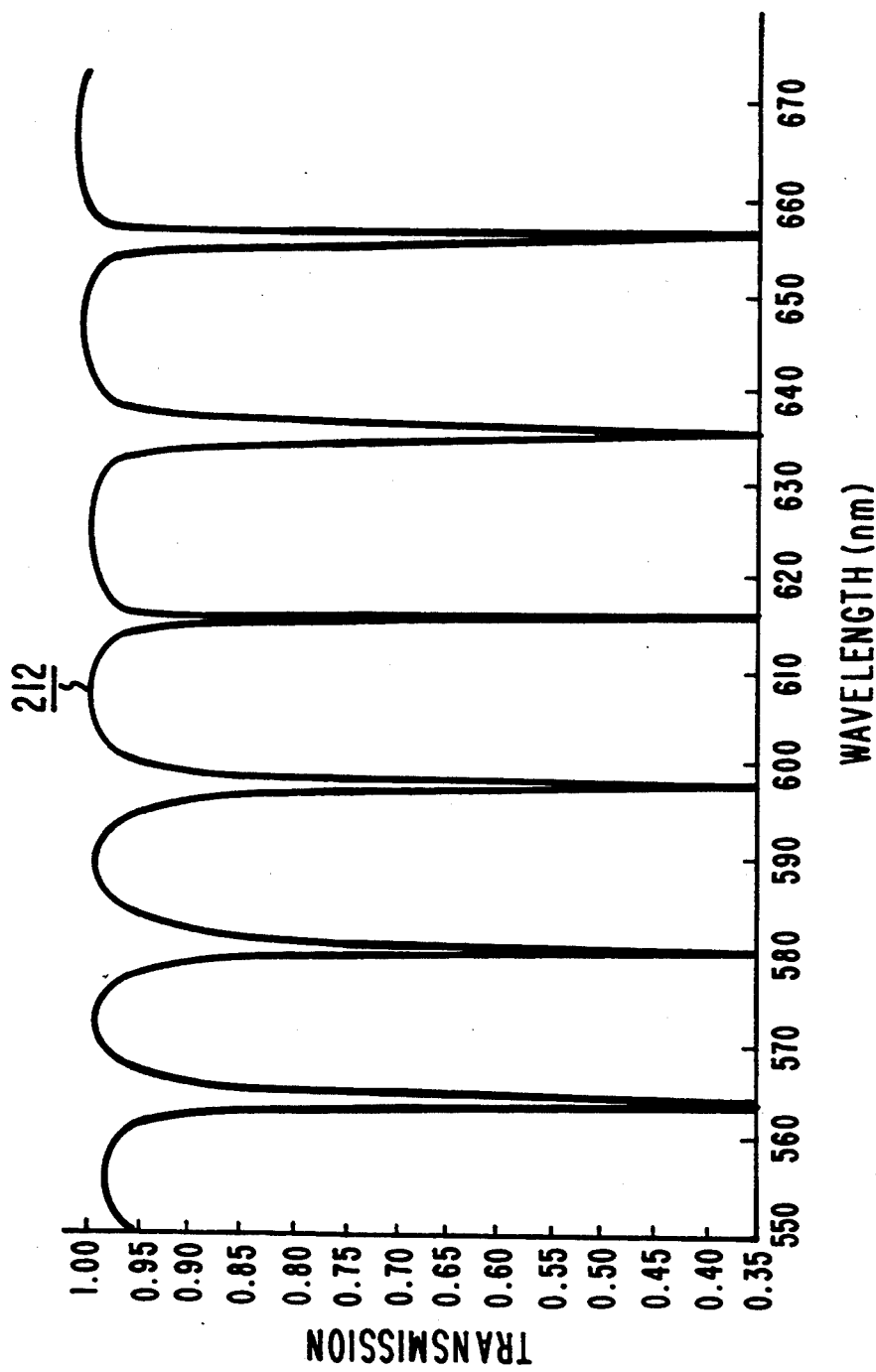
FIG. 2b is a corresponding plot of the reflection characteristics.

For the case of mutually parallel mirrors 16l and 16r, $\cos\theta$ is unity. In general, the etalon passes or transmits light at a wavelength at which the cavity length is a multiple of fractional submultiples of a wavelength. This may be understood by considering that, in order to transmit light, the multiple internal reflections must constructively add at the output semitransparent layer, and that an even number of reflections must occur for light to exit. The comb or multispectral response of an etalon, such as etalon 10 of FIG. 1, is illustrated by plot 210 of FIG. 2a. As illustrated, the transmission peaks occur periodically at wavelengths of 564, 580, 597, 616, 635, and 655 nm. The rejection peaks occur between the transmission peaks, as illustrated by plot 212 in FIG. 2b.

In operation, the embodiment of FIG. 1 may be considered to transmit light from optical fiber 40 to optical fiber 44, or vice versa, because the apparatus is bidirectional. Taking the example of light propagating in optical fiber 40 toward collimator lens 42, a beam of light is propagated along a first portion 30a of a light path including portions 30a and 30b. If the etalon 10 were not interposed in the light path, the beam of light emanated by collimator 42 would reach corresponding collimator 46, and the beam of light, together with its modulation or information, would enter optical fiber 44, for eventual use downstream of fiber 44. With etalon 10 interposed in the light path, however, the light arriving at the etalon along the first portion 30a of the light path may or may not reach second portion 30b of the light path, depending upon the state of the etalon, as established by voltage generator 60. It is easy to understand from the above that when voltage generator 60 is set to a direct voltage at which the desired wavelength of light is transmitted through the etalon, optical fibers 40 and 44 will be coupled together, to thereby establish a "closed" condition of a single-pole, single-throw switch (which corresponds to an "open" condition when viewing the switch as a gate, as is common in Europe). When the bias voltage is set so that the wavelength being switched is away from the transmission band or peak, the light wavelength lies in a rejection band, and the light incident on the etalon is reflected, and not coupled through the etalon. This establishes an "open" condition of the switch ("closed" condition of a gate). In actual practice, the voltage applied to the liquid crystal etalon is a square wave, so that no net current flows through the liquid crystal material, in order to prevent degradation of the material. In the case of other optical materials, however, direct voltages may be used if appropriate.

Figure 3:
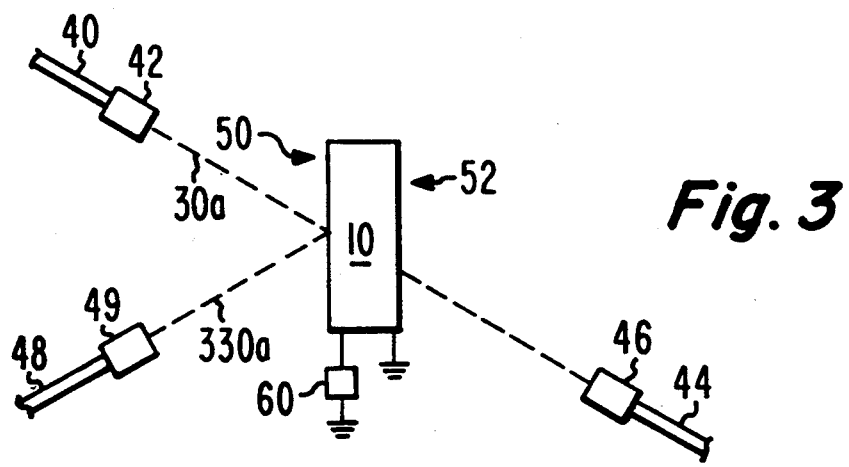
FIG. 3 is a simplified diagram illustrating how the switching device of FIG. 1 may be used as a single-pole, double-throw optical switch.

FIG. 3 illustrates another embodiment of the invention. FIG. 3 is similar to FIG. 1, except in that it includes a third optical fiber 48 through which light signals may pass to and or from a source or sink. In FIG. 3, optical fiber 48 terminates in a collimating lens 49, which may also provide a beam expanding function, so that a portion 330a of a light beam path 330 is defined, which intersects the surface of planar light port 50 of etalon 10 at the same angle as portion 30a of beam path 30. As a consequence, light traversing portion 30a of beam path 30 is reflected along portion 330a of beam path 330 when etalon 10 is in a closed (reflective) state. Similarly, of course, light traversing portion 330a of light beam path 330 is reflected, in the closed state of etalon 10, along portion 30a of light beam path 30 toward optical fiber 40. Thus, it is apparent that, in the arrangement of FIG. 3, the light source associated with optical fiber 40 may be considered to be the "common" pole or element of a single-pole, double throw switch, by which light at a particular wavelength originating at optical fiber 40 may be coupled to a light sink represented by optical fiber 44 (another "pole" of the switch) in one state, namely the transmissive state, of the "switching" etalon, while being decoupled from the light sink represented by optical fiber 48. When the etalon is switched to its alternate (reflective or nontransmissive) state, light originating at optical fiber 40 at the particular wavelength and flowing along portion 30a of optical path 30 is reflected by port 50, and flows along portion 330a of light beam path 330 to the light sink represented by optical fiber 48. In this second (reflective) state of the etalon, the apparatus of FIG. 3 may be considered to represent the same single-pole, double-throw optical switch, now coupling the "common pole", namely the light source represented by optical fiber 40, to the pole represented by optical fiber 48, while being decoupled from the pole represented by optical fiber 44.

Figure 4:
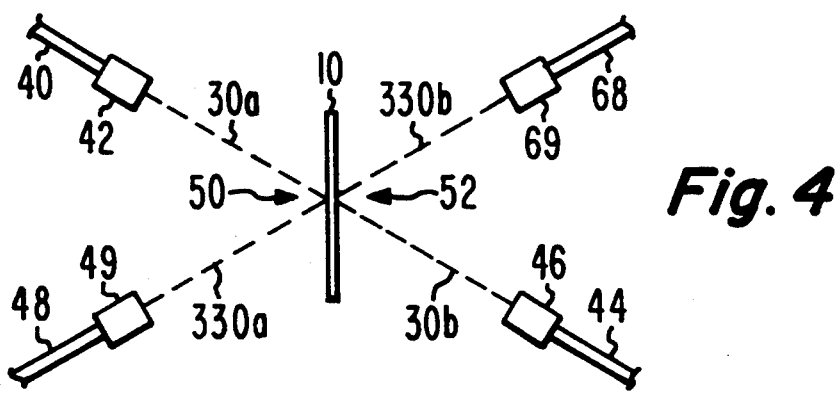
FIG. 4 is a simplified diagram illustrating how the switching device of FIG. 1 may be used as a more complex optical switch.

The arrangement of FIG. 4 is similar to that of FIG. 3, differing only in that a fourth optical fiber 68, representing a light source or sink, is coupled to a second portion 330b of light path 330. Optical fiber 68 may be terminated in a collimating or beam expanding collimating lens 69. When the etalon 10 of FIG. 4 is in its transmissive state for a particular wavelength, optical fiber 40 is coupled to optical fiber 44, and optical fiber 48 is coupled to optical fiber 68, but optical fibers 40 and 48 are not coupled (except, of course, by undesired leakage), nor are optical fibers 44 and 68. Similarly, when etalon 10 of FIG. 4 is in its reflective state for the particular wavelength, optical fiber 40 is coupled to optical fiber 48, and optical fiber 44 is coupled to optical fiber 68, but optical fibers 40 and 48 are not coupled to optical fibers 44 and 68. As mentioned above, the coupling paths are bidirectional, so the direction of light flow, and consequently of information flow, may be in either direction.

It should be noted that the switch according to the invention, being frequency- or wavelength-sensitive, can be used for switched demultiplexing. For example, if first and second disparate wavelengths of light are propagating on any of the optical fibers, as for example optical fiber 40 of FIG. 3, the etalon may be set to transmit the first wavelength and reflect the second, in which case the first wavelength will be coupled from optical fiber 40 to optical fiber 44, and the second will be coupled from optical fiber 40 to optical fiber 48. If, then, the etalon is tuned by adjustment of the bias voltage to transmit the second wavelength and reflect the first, the coupling will be reversed, with the second wavelength being directed to optical fiber 44, and the first wavelength to optical fiber 48.

Other embodiments of the invention will be apparent to those skilled in the art. For example, while optical fibers have been used to represent the light sources and sinks, any sources or sinks may be used, so long as they have the same characteristics. If optical fibers are used, they may be attached to the surface of the light ports of the etalon without intermediate free-space light paths, so long as the beams do not spread excessively within the etalon. Instead of liquid crystal material within the cavity of the etalon, any material may be used in which the optical path length may be varied by application of an electric field or current; some semiconductors and piezoelectric crystals fall into this class. One voltage-dependent organic optical crystal material is DAST, described in U.S. Pat. No. 5,094,553, issued Mar. 10, 1992 in the name of Yakymyshyn et al., and another is DASMS, described in U.S. Pat. No. 5,194,984, issued March 16, 1993 in the name of Boden et al.

What is claimed is:

1. An optical switch, comprising:
   a first optical fiber optically coupled with a first collimating lens, for transducing signals between said first optical fiber and a first portion of a first beam path by way of said first collimating lens;
   a second optical fiber optically coupled with a second collimating lens, for transducing signals between a said second optical fiber and a second portion of said first beam path by way of said second collimating lens;
   an active polarization-insensitive Fabry-Perot cavity etalon, including first and second planar light ports, for transmitting light at a plurality of transmission wavelengths related to the optical length of said cavity, and for reflecting light at reflection wavelengths other than said transmission wavelengths, said active polarization-insensitive Fabry-Perot cavity etalon further including electrodes to which bias voltage may be applied for changing the optical length of said cavity, said active polarization-insensitive Fabry-Perot cavity etalon being placed in said first beam path, with said first light port optically coupled by said first portion of said first beam path to said first collimating lens, and with said second light port optically coupled by said second portion of said first beam path to said second collimating lens; and bias voltage generating means coupled to said electrodes of said active polarization-insensitive Fabry-Perot cavity etalon, for controlling said optical length of said cavity, whereby, when a particular wavelength of light is applied to one of said first and second optical fibers, and said bias voltage is set to select said particular wavelength as said transmission wavelength, said particular wavelength of light is transmitted from said one of said first and second optical fibers, through the corresponding one of said first and second collimating lenses, and traverses a portion of said first beam path to one of said first and second light ports of said active polarization-insensitive Fabry-Perot cavity etalon, and is transmitted through said active polarization-insensitive Fabry-Perot cavity etalon to the other one of said first and second light ports, and traverses another portion of said first beam path from said other one of said first and second light ports to the other one of said first and second collimating lenses and the corresponding one of said first and second optical fibers, so that light is transmitted between said first and second optical fibers, and whereby, when said particular wavelength of light is applied to one of said first and second optical fibers, and said bias voltage is set to select a second wavelength, different from said particular wavelength, as said transmission wavelength, said particular wavelength of light is transmitted from said one of said first and second optical fibers, through the corresponding one of said first and second collimating lenses, and traverses a portion of said first beam path to one of said first and second light ports of said active polarization-insensitive Fabry-Perot cavity etalon, and is reflected by said active polarization-insensitive Fabry-Perot cavity etalon, so that light is not transmitted between said first and second optical fibers.

2. An optical switch according to claim 1, wherein each of said beam paths is a free-space beam path.

3. An optical switch according to claim 1, wherein: the planes of said first and second planar light ports of said active polarization-insensitive Fabry-Perot cavity etalon are mutually parallel;

said plane of said first planar light port is skewed away from orthogonal to said first portion of said first beam path, whereby light traversing said first portion of said first beam path, and reflected by said first light port of said active polarization-insensitive Fabry-Perot cavity etalon, traverses a first portion of a second beam path skewed relative to said first beam path; said optical switch further including a third optical fiber optically coupled with a third collimating lens, for transducing signals between said third optical fiber and said first portion of said second beam path, whereby, when said particular wavelength of light is applied to one of said first and third optical fibers, and said bias voltage is set to select said second wavelength, different from said particular wavelength, as said transmission wavelength, said particular wavelength of light is transmitted from one of said first and third optical fibers, through the corresponding one of said first and third collimating lenses, and traverses the corresponding first portion of one of said first and second beam paths to said first light port of said active polarization-insensitive Fabry-Perot cavity etalon, and is reflected by said first light port of said active polarization-insensitive Fabry-Perot cavity etalon, and traverses said first portion of the other one of said first and second beam paths to the other one of said first and third collimating lenses and the other one of said first and third optical fibers, so that, when said optical switch provides no coupling at said particular wavelength between said first and second optical fibers, coupling is provided at said particular wavelength between said first and third optical fibers.

4. An optical switch according to claim 3, wherein each of said beam paths is a free-space beam path.

5. An optical switch according to claim 3, wherein: said plane of said second planar light port is skewed away from orthogonal to said second portion of said first beam path, whereby light traversing said second portion of said first beam path, and reflected by said second light port of said active polarization-insensitive Fabry-Perot cavity etalon, traverses a second portion of said second beam path skewed relative to said first beam path; said optical switch further including a fourth optical fiber optically coupled with a fourth collimating lens, for transducing signals between said fourth optical fiber and said second portion of said second beam path, whereby, when said particular wavelength of light is applied to one of said second and fourth optical fibers, and said bias voltage is set to select said second wavelength, different from said particular wavelength, as said transmission wavelength, said particular wavelength of light is transmitted from one of said second and fourth optical fibers, through the corresponding one of said second and fourth collimating lenses, and traverses the second portion of the corresponding of one of said first and second beam paths to said second light port of said active polarization-insensitive Fabry-Perot cavity etalon, and is reflected by said second light port of said active polarization-insensitive Fabry-Perot cavity etalon, and traverses the second portion of the other one of said first and second beam paths to the other one of said second and fourth collimating lenses and the other one of said second and fourth optical fibers, so that, when said optical switch provides no coupling between said first and second optical fibers at said particular wavelength, coupling is provided at said particular wavelength between said second and fourth optical fibers.

6. An optical switch according to claim 5, wherein each of said beam paths is a free-space beam path.

7. An optical switch according to claim 1, wherein said active polarization-insensitive Fabry-Perot cavity etalon, further includes:

first and second mutually parallel semitransparent substrates defining a cavity therebetween, and further including liquid crystal material within said cavity, said cavity being bounded by means for tending to align the molecules of said liquid crystal material parallel to the interior surfaces of said cavity, with those molecules adjacent said first substrate being oriented orthogonal to those molecules adjacent said second substrate, whereby light tends to be propagated by said liquid crystal material, and light traversing said cavity with said molecules of said liquid crystal material oriented parallel with said surfaces of said substrate experiences a particular index of refraction for all polarizations, said Fabry-Perot etalon further including first and second transparent electrodes associated with said first and second substrates, respectively, for, when subjected to a differential voltage, tending to rotate said molecules of said liquid crystal material toward a position orthogonal to both said first and second substrates, thereby tending to make said liquid crystal material non-birefringent for all polarizations of light traversing said cavity, whereby said Fabry-Perot etalon is polarization-insensitive in both the energized and deenergized states of said liquid crystal material of said Fabry-Perot etalon.

8. An optical switch according to claim 7, wherein each of said beam paths is a free-space beam path.

* * * * *